Figure 1:
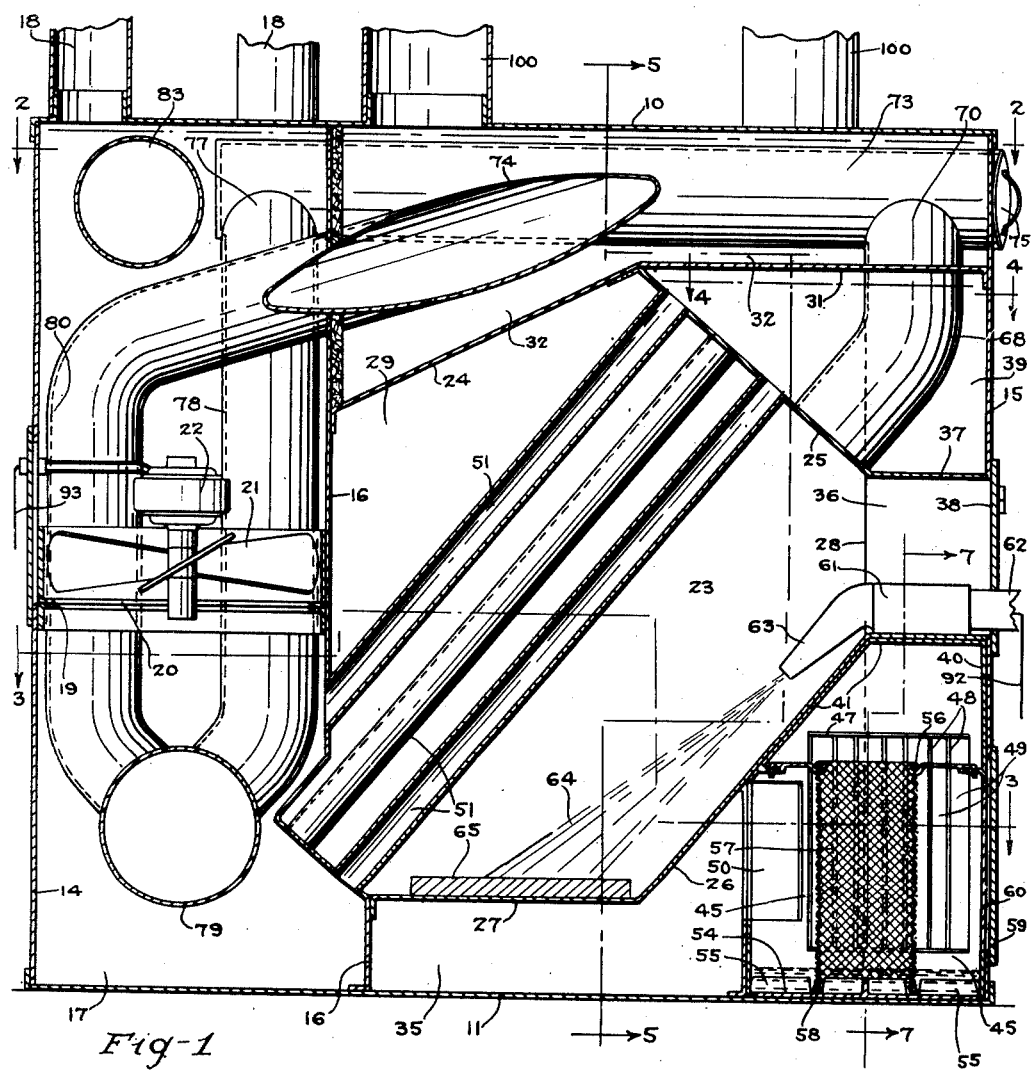

Feb. 23, 1932.   F. A. WHITELEY   1,846,292
HOT AIR HEATING PLANT
Original Filed March 15, 1928   4 Sheets-Sheet 1

Inventor
F. A. Whiteley.
By Whiteley and Ruckman
Attorneys.

Feb. 23, 1932.    F. A. WHITELEY    1,846,292
HOT AIR HEATING PLANT
Original Filed March 15, 1928    4 Sheets-Sheet 2
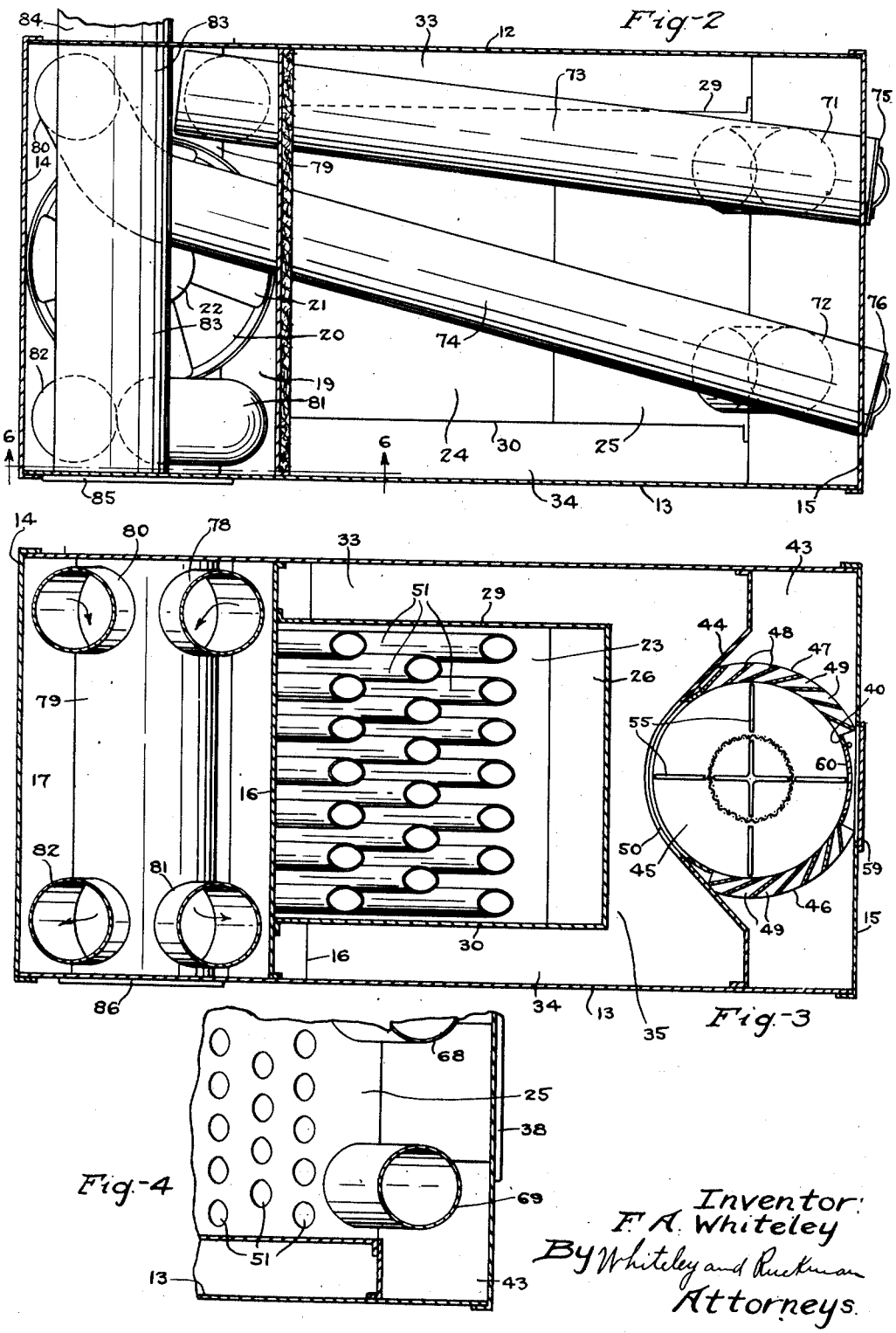

Feb. 23, 1932.                  F. A. WHITELEY                  1,846,292
                              HOT AIR HEATING PLANT
                  Original Filed March 15, 1928      4 Sheets-Sheet 3

Inventor:
F. A. Whiteley
By Whiteley and Ruckman
Attorneys.

Feb. 23, 1932.  F. A. WHITELEY  1,846,292

HOT AIR HEATING PLANT

Original Filed March 15, 1928   4 Sheets-Sheet 4

Inventor:
F. A. Whiteley.
By Whiteley and Ruckman
Attorneys.

Patented Feb. 23, 1932

1,846,292

UNITED STATES PATENT OFFICE

FRANK A. WHITELEY, OF MINNEAPOLIS, MINNESOTA

HOT AIR HEATING PLANT

Application filed March 15, 1928, Serial No. 261,775. Renewed May 14, 1931.

My invention relates to furnaces for hot air heating plants and has for its object to provide a novel arrangement of heat chamber, combustion discharge passageways and air passageways such that the heat generated by fluid fuel burners (oil burners, gas burners and the like) will practically all of it be taken up by the air passing through the furnace before the combustion gases finally leave the same.

I accomplish this object by providing a relatively long travel for the air being heated as it passes from the intake chamber to the discharge chamber and at the same time providing an excessively large area of heated surfaces over which said air is caused to pass whereby all of said heat is abstracted and delivered to the hot air pipes leading from the discharge chamber. It is an object of my invention to provide means for drawing the air under negative pressure into the intake chamber and for forcing it therefrom through the various passage-ways and chambers to the hot air pipes from the discharge chamber and thence to the rooms to be heated. It is a further object of my invention to form the intake chamber as a part of the furnace proper adjacent one wall thereof and to form in said intake chamber a system of flues or pipes for final discharge of the gases of combustion. This arrangement is such that the gases of combustion circulating in these passages just prior to withdrawal from the furnace to the stack are at their lowest temperatures, so that the outer surfaces of these pipes or passages are contacted with the cold air coming to the furnace, the relative difference in the temperatures between incoming air and combustion gas discharge pipes being such that heat units are here abstracted even though the furnace gases have been reduced to a comparatively low temperature.

It is a further object of my invention to provide a central heat chamber roughly circular or hexagonal in its longitudinal cross section in combination with a fluid fuel burner adapted to direct a flame downwardly in the heat chamber, and with means for withdrawing the furnace gases at points above the burner on both sides of the heat chamber so that the gases in the heat chamber will be caused to whirl or rotate in planes on each side of the burner; and to provide a multiplicity of air passages extending across said rotating whirls of furnace gases. It is a further object of my invention to provide, in connection with this central heat chamber and crossing air passageways, an air intake chamber delivering to said passageways near the bottom of the furnace, an air-receiving chamber receiving the air from said passageways near the top of the furnace, an air-moistening and purifying chamber at the front and lower part of the furnace, and an air-delivery chamber at the top of the furnace together with passageways connecting all of said chambers, all of said chambers and all of said passageways having walls or part of their walls exposed to the gases in the heat chamber. It is a further object of my invention to discharge the furnace gases through a multiplicity of flues extending through the air-receiving chamber, the air-discharge chamber and the air-intake chamber. It is a further object of my invention to provide air-moistening and cleaning means whereby the air as it passes through the air-moistening and cleaning chamber is freed from dust and solid impurities and is impregnated with a requisite amount of moisture.

Other objects of my invention are to provide a hot-air furnace of small size in proportion to its heat transferring capacity which shall be rectangular in cross section in planes parallel to all of its walls; to construct this furnace of sheet metal welded or otherwise secured together to be gas-tight and to be made at moderate cost; to control the operation of the fluid fuel burner and the fan by means of a thermostat, and to synchronize the operation of fuel burner and fan so that the fuel burner will begin to operate ahead of the fan and the fan will continue to operate a desired period after termination of operation of the fuel burner; to provide simple closures rendering easy of access for cleaning or other purposes all parts of the interior of the furnace which may need to be got at; to provide means for maintaining a supply of water in the moistening device and means of readily withdrawing accumulations of dirt therefrom; and other objects and advantages which will more fully appear in connection with the detailed description of my invention, and which are fully pointed out in the appended claims.

It is a particular object of my invention to provide a furnace adapted to the use of fluid fuel burners, that is, burners using various kinds of fuel oils and generally known as "oil burners," and burners using gas. This type of burner is distinguished from solid fuel burners, i. e., furnaces burning coal, coke or wood, in that the heat is all generated in a gas as combustion takes place and there is no residual heat-radiating mass in the heat chamber. Building regulations require that the furnace gas passageways from oil burners or gas burners must not be obstructed by dampers or similar means to restrict the escape passageways. As a result, in furnaces of the type ordinarily employed for burning solid fuel, the gases of combustion of oil burners and gas burners have a comparatively short travel from the flame to the stack pipe; and that short distance is traversed with increased speed because nearly all burners of this type operate under forced draft, blowing the combustion air in with the fuel and gas. The result is that in furnaces as now generally used with oil burners and gas burners, the gases of combustion leave the furnace at a high temperature and so rapidly that there is very great waste of heat. So much so, that they are markedly uneconomical in fuel consumption and, hence, operating cost. This, notwithstanding the manifold advantages of oil burners and gas burners, has greatly limited their use. It is the purpose of my invention to so increase the length of travel of the gases of combustion, without in any way restricting their free egress to the stack pipe, and correspondingly increasing the gas heated surfaces exposed to the circulating air, as to withdraw nearly all the heat units from the burning gas or oil and thereby cut out the waste of heat accompanying the use of oil burners and gas burners so as to make them economically usable in a high degree.

In the drawings, illustrating a form of my invention,—

Figures 8, 9:
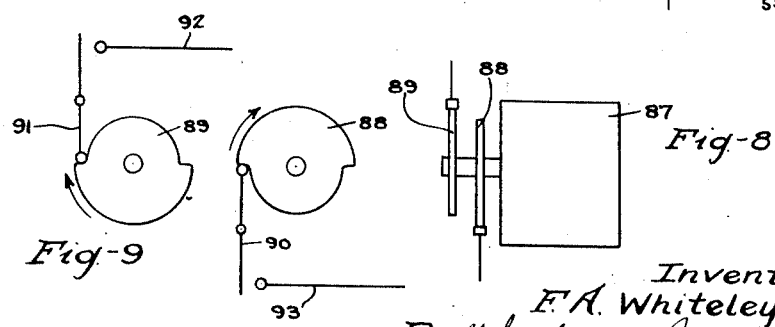
Figures 5, 6:
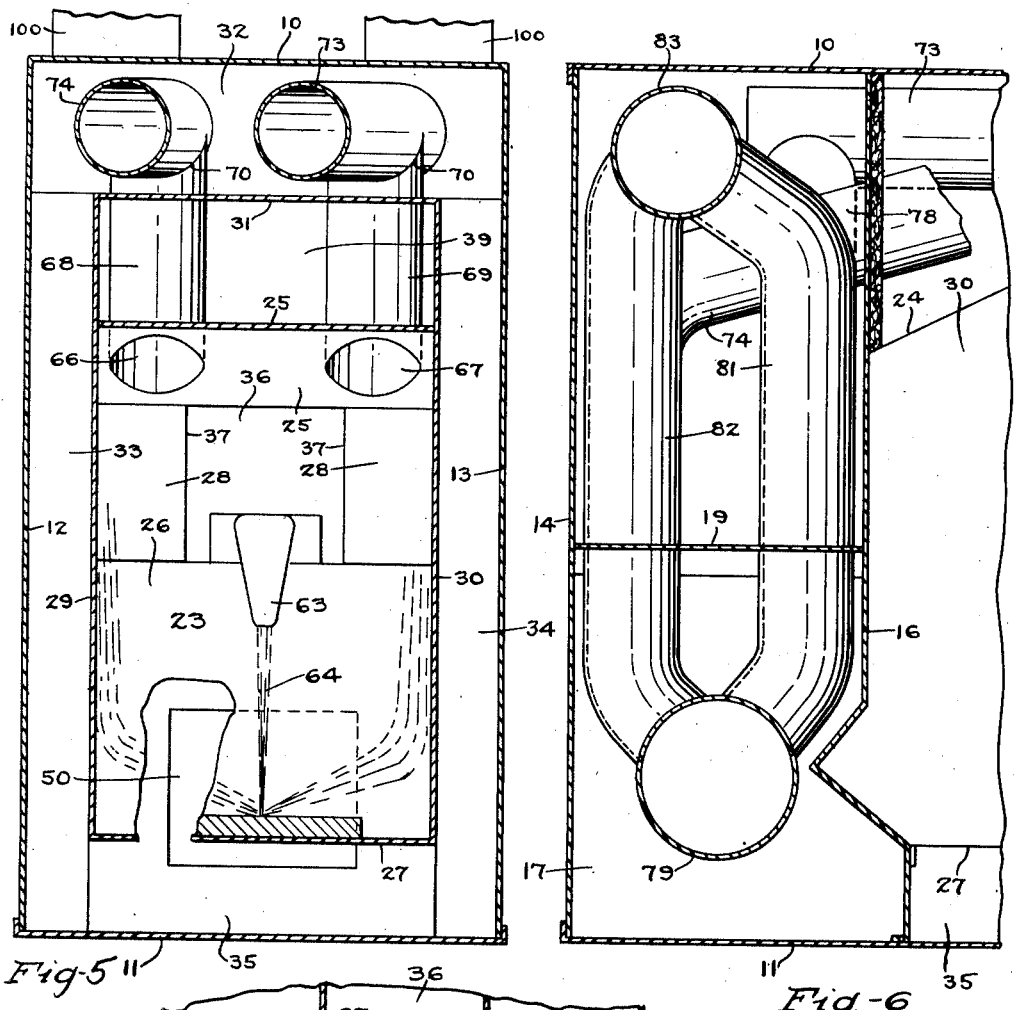
Figure 7:
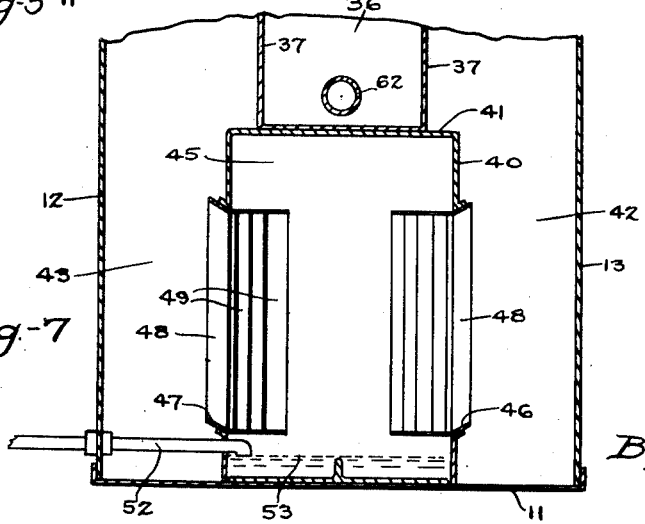
Figure 10:
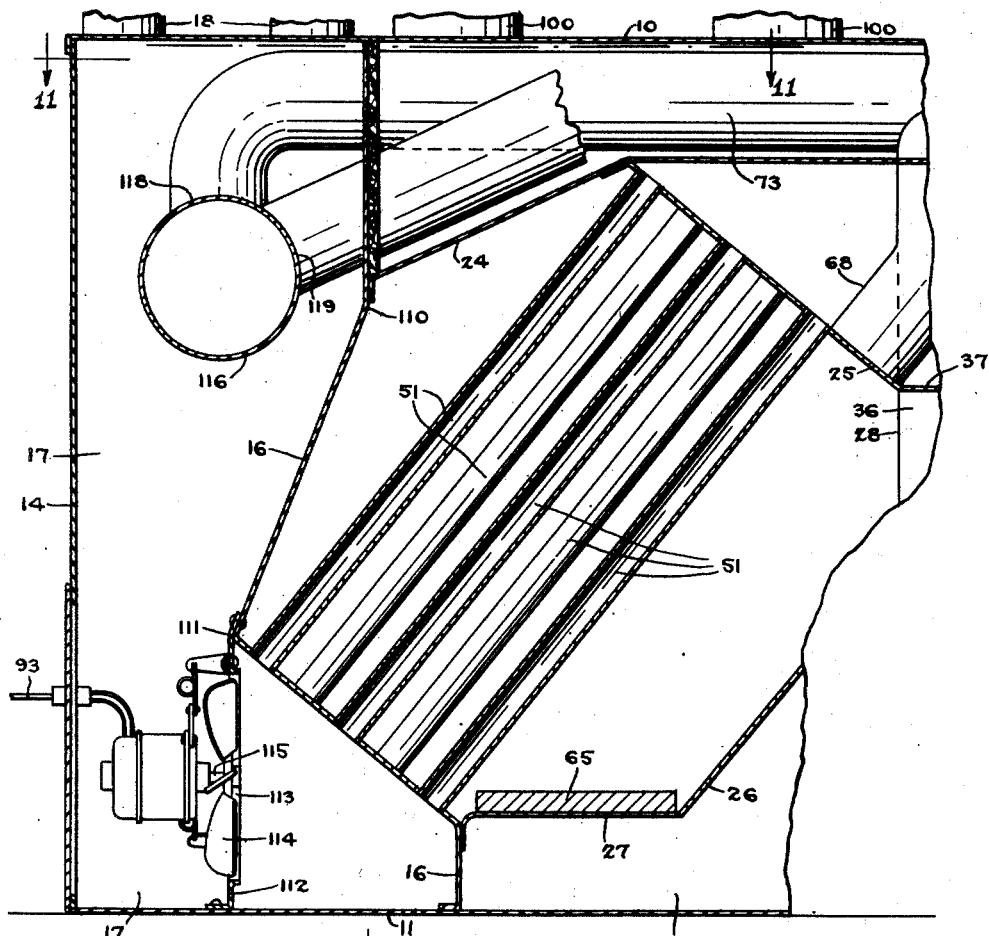
Figure 11:
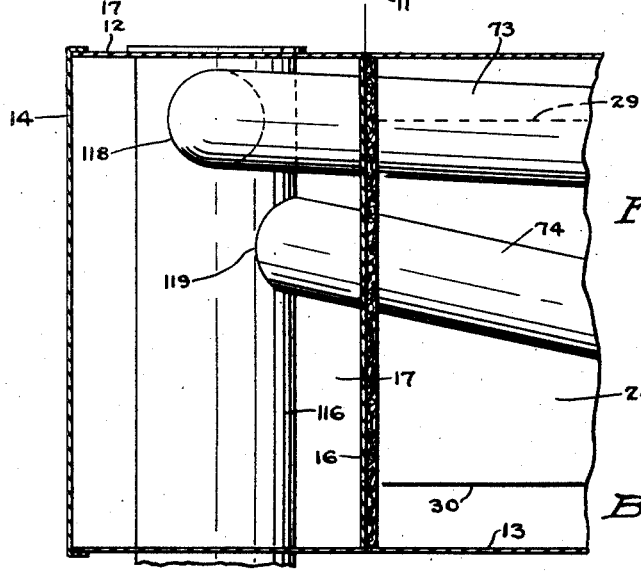

Fig. 1 is a longitudial section through the center of the furnace. Fig. 2 is a sectional plan on line 2—2 of Fig. 1 viewed in the direction of the arrows. Fig. 3 is a corresponding sectional plan on line 3—3 of Fig. 1 viewed in the direction of the arrows. Fig. 4 is a fragmentary sectional plan view on line 4—4 of Fig. 1 viewed in the direction of the arrows. Fig. 5 is a transverse sectional elevation taken on line 5—5 of Fig. 1 viewed in the direction of the arrows. Fig. 6 is a part of the longitudinal sectional elevation similar to the part shown taken on line 6—6 of Fig. 2 and viewed in the direction of the arrows with the fan omitted. Fig. 7 is a transverse sectional elevation view of part of the front of the furnace embodying the moistening and purifying chamber taken on line 7—7 of Fig. 1 and viewed in the direction of the arrows. Figs. 8 and 9 are diagrammatic views of thermostat control means for synchronizing the control and operation of the burner and the fan. Fig. 10 is a sectional, longitudinal elevation of part of the furnace, showing a modified form of air intake chamber and fan and blower mechanism. Fig. 11 is a top plan sectional view of a portion of the furnace as shown in Fig. 10.

The outer parts of my furnace comprise a casing having top and bottom walls 10 and 11, side walls 12 and 13 and end walls 14 and 15. It will be noted that this outer casing embodies six rectangular walls connected together so that the body of the furnace is rectangular in cross section along its horizontal, and its transverse and longitudinal vertical planes, a matter of great utility in the shipping, handling and installation of such furnaces. A transverse partition 16 extends from top to bottom along one end of this outer casing and from side to side forming a closed intake chamber 17 which is adapted to receive the air to be heated from pipes 18 which constitute the cold air return pipes leading down from the different rooms to be heated. A transverse horizontal partition 19 divides this intake chamber into two parts and is provided with a central aperture 20 over which is a fan and fan casing 21 operated by an electric motor 22. A heat chamber 23, roughly hexagonal in longitudinal vertical cross section, as clearly shown in Figs. 1 and 10, has its rear wall formed by the partition 16, upper walls by partitions 24 and 25, lower walls by partitions 26 and 27, front burner opening wall by partition 28 and side walls by partitions 29 and 30. The heat chamber top wall 24 extends beyond the wall 25, as indicated at 31 in Fig. 1, parallel with and spaced from the outside top wall 10, forming an upper air delivery chamber 32. The side walls 29, 30 of the heat chamber are spaced from the outside walls 12, 13 forming vertical passageways 33, 34 extending along said side walls and opening at their tops into the air delivery chamber 32 and at their bottoms into a bottom passageway 35 which extends entirely across under the bottom wall 27 and part of the bottom wall 26 of the heat chamber 23. Opening 36 extends forward from the heat chamber 23, being surrounded by casing walls 37 and closed by a door 38. A hot air receiving chamber 39 is formed extending entirely across the upper part of the furnace below the partition 31 and hot air delivery chamber 32 and above the partitions 25 and 37. A circular casing 40 formed with a closed top 41 is provided under the encased opening 36 so that downwardly extending air trunks 42, 43 are formed on either side of said circular casing. These air trunks are shut off from the lower passageway 35 and the side passageways 33, 34 by a partition 44 which bulges around the circular casing 40, as clearly shown in Fig. 3. Air from trunk 42 enters the chamber 45 within the circular casing 40 through a boxing 46, and air from trunk 43 enters the chamber 45 through the boxing 47. The boxings 46 and 47 are provided with veins 48 tangentially disposed toward the casing 40 so as to provide a multiplicity of longitudinal openings 49 extending in opposite directions in the respective boxings. The air is thus given a gyratory or cyclonic motion within the chamber 45 and it leaves the chamber through an opening 50, discharging into the chamber 35 which extends below the heat chamber 23 and connects with the side passageways 33 and 34 which lead to the hot air discharge chamber 32. Extending from the lower part of the intake chamber 17 and from the lower part of the heat chamber 23 are a multiplicity of pipes 51 which conduct the air across the heat chamber from the lower part thereof to the upper part, said pipes discharging into the air-receiving chamber 39, all as clearly shown in Fig. 1.

The air is caused to rotate in the chamber 45. Water is automatically fed into the bottom of chamber 45 through a pipe 52, which keeps the water in the bottom of the chamber at a constant level as indicated at 53. Any well-known means of controlling the entrance of the water as it is withdrawn to keep the level constant may be used. In the bottom of chamber 45 is a grid having a flat disc bottom 54 provided with a multiplicity of radiating vertical plates 55 which break up the body of water in chamber 45 so as to prevent its rotation. Suspended from a bar 56 toward the upper part of chamber 45 is a circular wicking 57, the lower part of which is held by a weighted ring 58 upon the disc 54 so that the lower part of said circular wicking will always be immersed in the water in the chamber 45. In this manner the heated air will be caused to circulate rapidly in chamber 45 before it is discharged through opening 50 and will at the same time deposit in the water particles of dust, dirt and solid matter which it may carry, and will take up a requisite amount of moisture so that the air delivered to the rooms will be suitably moistened. A door 59 in the front casing wall 15 and a separate door 60 which opens through cylindrical casing 40 and is adapted to be reached through said door 59 admit to the interior of chamber 45 for taking out the wicking so that fresh and clean wicks may be inserted, and for taking out the grid and disc 54 by which accumulations of dirt collected may be withdrawn.

In the front opening 36 a burner 61 for oil or gas of any desirable and known type is supported with feed of air and fuel extending through the door 38, as indicated at 62. The burner is provided with a downwardly-turned nozzle 63 of a well-known type whereby a flame indicated at 64 is directed downwardly substantially parallel with the angularly-disposed bottom wall 26 and is blown against a plate 65 of fire brick or other refractory material. From this plate 65 the gases of combustion will spread laterally and rearwardly, rotating in a broad cyclone along the side walls of the heat chamber, across and over the pipes 51 and against the upper walls 24 and 25, leaving the heat chamber through flue openings 66 and 67 symmetrically disposed and positioned above and laterally spaced from said burner nozzle 63, as clearly shown in Fig. 5. From the flue openings 66 and 67 smoke pipes 68 and 69 lead through the air-receiving chamber 39 and through partition 31, connecting by a T joint, as indicated at 70 of Fig. 1 and at 71 and 72 of Fig. 2, into substantially horizontal smoke pipes 73 and 74. Said pipes 73 and 74 extend through the front casing wall 15 and are provided with removable closures 75 and 76 by which ready access to said pipes is had for cleaning them should that at any time become necessary. The pipe 73 passes through the wall 16 into the air intake chamber 17 and makes a T-connection at 77 with a vertical pipe 78 located close to the wall 16, which pipe connects with an enlarged horizontal pipe 79 extending across the lower part of the air-intake chamber 17, as clearly shown in Figs. 1 and 6. Pipe 74 is carried downwardly and curved over to make a union with a vertical pipe 80 in the air-intake chamber 17 and adjacent the other wall 14 thereof, which pipe 80 is united with pipe 79 as clearly shown in Figs. 1 and 3, the pipes 78 and 80 being at one end of the air-intake chamber 17 adjacent the wall 12. From the other end of pipe 79 in the intake chamber 17 and adjacent the wall 13 rise vertical pipes 81 and 82 which are connected with the horizontal smoke discharge pipe 83, as clearly shown in Figs. 2, 3 and 6. The pipe 83 extends through the outer wall 12, as indicated at 84, going from there to the stack. Pipes 83 and 79 each extend through the wall 13 and are provided with closures 85 and 86, to permit access for cleaning.

From the above it will be seen that the gases of combustion after rotating in a great whirl in the roughly hexagonal heat chamber 23 pass in two streams through pipes 67, 73 and 78 and pipes 68, 74 and 80 to the common horizontal pipe 79, and through pipe 79 and duplicate elevating pipes 81, 82 to the stack pipe 84. In all of this travel the walls of the various pipes carrying the gases of combustion are exposed to the air being heated and delivered from the furnace. There is thus, in addition to the walls of the heat chamber, heating means in the air-receiving chamber 39 consisting of the pipes 68 and 69, heating means in the air delivery chamber 32 consisting of the pipes 73 and 74 and connections from 68 and 69, and a very large amount of heating means in the air-intake chamber 17 consisting of parts of pipes 73 and 74 and all of pipes 78, 80, 79, 81, 82 and 84. It is important to note, also, that the gases of combustion in the air-intake chamber have been progressively cooled so that as they travel through pipes 79, 81, 82 and 83 they are at their minimum temperature. But at this point they are subjected to air in the intake chamber, also at its minimum temperature, so that the difference in temperature between the incoming air and the surface of these pipes will still result in rapid withdrawal of heat units.

The operation of the burner 61 and the fan 21 or its motor 22 is automatically controlled by a thermostat in a well-known way. I provide means, however, for synchronizing the starting and stopping of the burner and the fan respectively so that the burner will start a desired time ahead of the fan and the fan will continue to run after the burner becomes inoperative for the same length of time. This is accomplished by means of a motor 87 indicated in Fig. 8 of common construction which is operated by a thermostat in the well-known way. This motor is provided with a pair of cam members 88 and 89 which are shown in detail in Fig. 9. They are oppositely disposed, although rotating in the same direction. Switch operators 90 and 91 engage the cam surfaces and are shown in the position where the switches are open and both instrumentalities inoperative. The burner circuit is indicated by the reference numeral 92 and the fan circuit by reference numeral 93. The motor is set to turn the cams one complete half turn for each actuation, and the time of making this half turn may, of course, be determined in a well-known way, from one to three minutes being a suitable time for the purpose desired. Taking the cams as they are shown set in Fig. 1 it will be apparent that immediately upon operation contact will be made to set the burner apparatus in operation, but that contact to set the fan in operation will not take place until the cams have completed their half turn. The reverse result will follow the next actuation.

In the modification shown in Figs 10 and 11, the wall 16 is bent as indicated at 110 and again at 111, to be carried forward across the flush ends of the pipes 51 which, in this modification, may conveniently be made more numerous. In this form no central horizontal partition across chamber 17, such as partition 19, is employed. Instead a vertical partition 112 extends in parallel relation to the rear wall 14 to the casing and is united at 111 with partition 16. A central opening 113 is provided in the partition 112 through which air is blown from a fan 114, having its drive shaft 115 horizontal instead of vertical as is true of the drive shaft of fan 21. There are some advantages in using a fan with a horizontal drive shaft instead of a vertical drive shaft. It will be apparent, however, that so far as drawing the air from the intake chamber 17 and forcing it through the pipes 51 is concerned, fans 21 and 114 will operate in a similar manner.

In the modified form of Figs. 10 and 11, pipes 73 and 74 connect directly with a single pipe 116 of large diameter, similar to pipe 79, located toward the upper part of the chamber 17 and at its center, as clearly indicated at 118 and 119 of Figs. 10 and 11. In this form of the invention, there will be less travel of gases of combustion in passages extending through the inlet chamber which may be desirable in furnaces employing gas as the fuel, since there is a tendency for acid liquids to be formed from the combustion gases derived from burning gas, which may have a corrosive effect upon flues or pipes and might make the extended gas travel as shown in Figs. 1, 2 and 3 undesirable. The principle of operation, the operation upon and travel of air being heated, and the travel of the gases of combustion (except to a similar degree in the ignition chamber) is the same in the modification of Figs. 10 and 11 as in the form illustrated in Fig. 1.

While I have described and shown preferred embodiments of my invention in this specification and in the drawings accompanying it, I do not wish to be limited to precise details of construction, kinds of material, or forms or shapes of parts, since the invention may be embodied in structures differing in detail, form and material without departing from the spirit and scope of the invention.

The operation of the furnace will be apparent from the above description. When the cam is actuated power being available the burner will go into operation and heat up the tubes 51 and the walls of the heat chamber and the various smoke discharge pipes. The fan will then start drawing in air from the rooms to be heated to the intake chamber 17. From there the air will be driven through the pipes 51 to the receiving chamber 39, being greatly heated as it passes through the pipes 51. In the receiving chamber 39 it will be additionally heated by the pipes 68, 69, going from there through the trunks 42 and 43 into the chamber 45, where it will be freed from dirt and moistened. It will then pass into the passage way 35 and from there up the side passageways 33 and 34 to the heat-delivery chamber 32, from which it will go through pipes 100 to the various rooms to be heated. From this long travel in contact with heated surfaces, and particularly from the fact that the cold air contacts with the coldest pipes, the heat of the furnace will be very largely withdrawn. This furnace preferably will be operated with a very hot flame for relatively short periods of time as heat transference is more effective where the difference in temperature between the heat-receiving medium and the heating medium is relatively great. In some cases it may be desirable not to carry the furnace gases into the lower part of the air-intake chamber 17, in which case connections may be made directly between pipes 73 and 74 and stack pipe 83, as indicated in Figs. 10 and 11.

I claim:

1. A hot air heating plant comprising a casing forming a central heat chamber, an air intake chamber, an air receiving chamber, an air moistening and cleaning chamber and an air delivery chamber, each of said chambers having part of its walls formed of heat chamber walls, and means for conducting air from the intake chamber across the heat chamber and through each of said other chambers in succession.

2. A hot air heating plant comprising a casing forming a heat chamber, an air intake chamber, an air receiving chamber and an air delivery chamber, a fluid fuel burner for directing a flame into said heat chamber, and pipes extending through the air receiving chamber, the air delivery chamber and the air intake chamber, said pipes being arranged to convey the products of combustion successively through said chambers in the order stated.

3. A hot air heating plant comprising a casing forming a heat chamber, an air intake chamber, and an air delivery chamber, a fluid fuel burner for directing a flame into said heat chamber, and a multiplicity of pipes extending from said heat chamber through the air delivery chamber and the air intake chamber for conducting away gases of combustion.

4. A hot air heating plant comprising a casing forming a heat chamber and air passageways, including an air intake passageway, a fluid fuel burner for directing a flame into said heat chamber, and means including a pipe in said air intake chamber for conducting away the gases of combustion.

5. A hot air heating plant comprising a casing forming a heat chamber and air passageways including an intake passageway and air pipes extending across the heat chamber, a fluid fuel burner for directing a flame into said heat chamber, means for conducting the gases of combustion from said heat chamber and through said air passageways such that the last and coolest portions of said means will be in the intake passageway for conducting and warming the coolest air into the heating plant.

6. A hot air heating plant comprising a casing forming a heat chamber and air passageways, and arranged so as to conduct air through said passageways to cause the air successively to pass along one end of the heat chamber, across the heat chamber, along another end of the heat chamber, under the heat chamber, along its sides and above its top.

7. A hot air heating plant comprising a casing forming a heat chamber and air passageways, arranged so as to conduct air through said passageways to cause the air successively to pass along one end of the heat chamber, across the heat chamber, along another end of the heat chamber, under the heat chamber, along its sides and above its top, and a fan for forcing the air through said passages and discharging it above the heat chamber.

8. A hot air heating plant comprising a casing forming a central heat chamber and air-conducting passageways including passageways extending within and across the upper portion of the heat chamber and other passageways along the outside of all the walls of the heat chamber, and means for causing air to travel successively through all said passageways.

9. A hot air heating plant comprising a casing forming an interior heat chamber and air passages surrounding the same for conducting the air, said heat chamber being roughly hexagonal in shape, a fluid fuel burner, and means for directing the flame from the burner downwardly and for discharging the gases of combustion at points above said burner, said directing and discharging means being positioned relatively to each other and to the casing so as to cause said gases of combustion to form a whirl in the heat chamber.

10. In a heating plant, a casing forming a heat chamber and passages for causing the air to pass around said heat chamber, means for forcing said air through said passageways, a cleaning and moistening chamber forming part of said passages comprising means for causing the air to whirl therein, and a wick for moistening the air.

11. A hot air heating plant comprising a casing forming a central heat chamber, an air intake chamber, an air receiving chamber and an air delivery chamber, each of said chambers having part of its walls formed by walls of the heat chamber for heating air therein, and additional means for conducting gases of combustion through each of said air chambers for additionally heating said air.

12. A hot air heating plant comprising a casing forming a central heat chamber, an air intake chamber, an air receiving chamber and an air delivery chamber, each of said chambers having part of its walls formed by walls of the heat chamber for heating air therein, additional means for conducting gases of combustion through each of said air chambers for additionally heating said air, and a battery of pipes extending across said heat chamber for conducting air from the air intake chamber to the air delivery chamber.

13. A hot air heating plant comprising a casing forming a central heat chamber, an air intake chamber, an air receiving chamber and an air delivery chamber, each of said chambers having part of its walls formed by walls of the heat chamber for heating air therein, additional means for conducting gases of combustion through each of said air chambers for additionally heating said air, and a fan in said intake chamber for causing a forced draft of air through each of said chambers in succession.

14. A hot air heating plant comprising a casing forming a central heat chamber, an air intake chamber, an air receiving chamber and an air delivery chamber, each of said chambers having part of its walls formed by walls of the heat chamber for heating air therein, additional means for conducting gases of combustion through each of said air chambers for additionally heating said air, a battery of pipes extending across said heat chamber for conducting air from the air intake chamber to the air delivery chamber, and a fan in said intake chamber for causing a forced draft of air from said intake chamber through said pipes and through each of said other chambers in succession.

15. A hot air heating plant comprising a casing forming a heat chamber and an air intake chamber, said air intake chamber having part of its walls formed by walls of the heat chamber, and means for conducting gases of combustion through said intake chamber for heating the air therein additionally to the heating thereof by the walls of the heat chamber.

16. A hot air heating plant comprising a casing forming a central heat chamber, an air intake chamber, an air receiving chamber and an air delivery chamber, each of said chambers having part of its walls formed by walls of the heat chamber for heating air therein, additional means for conducting gases of combustion through each of said air chambers for additionally heating said air, and a fluid fuel burner for applying flame and heat into said heat chamber under forced draft to cause the same to impinge upon and wipe all walls of said heat chamber.

17. A hot air heating plant comprising an outer rectangular casing and an inner casing forming a heat chamber, all of whose walls are spaced from the walls of the outer casing to form chambers and passages for heating air, said chambers and passages being connected to cause the air to travel about all walls of said heat chamber, part of said air travel being downward, and a fan for moving said air.

18. A hot air heating plant comprising an outer rectangular casing and an inner casing forming a heat chamber, all of whose walls are spaced from the walls of the outer casing to form chambers and passages for heating air, said chambers and passages being connected to cause the air to travel about all walls of said heat chamber, and smoke flues extending within the chambers above and at each end of said heat chamber.

19. A hot air heating plant, comprising a casing, forming a central heat chamber, an air intake chamber, an air receiving chamber, and an air delivery chamber, and a fluid fuel burner for applying flame and heat into said heat chamber under forced draft so as to cause the same to impinge upon and wipe all walls of said heat chamber.

20. In a heating plant, a casing forming a heat chamber and passages for conducting the air around said heat chamber, means for forcing the air through said passageways, and an air cleaning chamber forming part of said passageways comprising means for causing the air to whirl therein.

21. In a heating plant, a casing forming a heat chamber and passages for conducting the air around said heat chamber, means for forcing the air through said passageways, an air cleaning chamber forming part of said passageways comprising means for causing the air to whirl therein, a water pan in said air cleaning chamber, and means for maintaining water at a fixed level therein.

22. In a heating plant, a casing forming a heat chamber and passages for conducting the air around said heat chamber, means for forcing the air through said passageways, an air cleaning chamber forming part of said passageways comprising means for causing the air to whirl therein, a water pan in said air cleaning chamber, means for maintaining water at a fixed level therein, and a wick in the air-cleaning chamber having an end dipping into the water in the pan.

23. In a heating plant, a casing forming a heat chamber and passages for conducting air around said heat chamber to a point of discharge therefrom, part of said passages being formed into a circular air-cleaning chamber, having walls formed with tangential vanes for causing air moved through the air-cleaning chamber to rotate therein, and a fan for moving the air.

24. In a heating plant, a casing forming a heat chamber and passages for conducting air around said heat chamber to a point of discharge therefrom, part of said passages being formed into a circular air-cleaning chamber, having walls formed with tangential vanes for causing air moved through the air-cleaning chamber to rotate therein, a fan for moving the air, and a removable water pan in the bottom of said air-cleaning chamber.

25. In a heating plant, a casing forming a heat chamber and passages for conducting air around said heat chamber to a point of discharge therefrom, part of said passages being formed into a circular air-cleaning chamber, having walls formed with tangential vanes for causing air moved through the air-cleaning chamber to rotate therein, a fan for moving the air, a water pan in the bottom of the air-cleaning chamber, and means for maintaining water in the pan at a constant level.

26. In a heating plant, a casing forming a heat chamber and passages for conducting air around said heat chamber to a point of discharge therefrom, part of said passages being formed into a circular air-cleaning chamber, having walls formed with tangential vanes for causing air moved through the air-cleaning chamber to rotate therein, a fan for moving the air, a water pan in the bottom of the air-cleaning chamber, and a wick positioned vertically above and dipping into the water of the pan.

27. In a heating plant, a casing forming a heat chamber and passages for conducting air about said heat chamber from the inlet point in said passages to the point of discharge therefrom, means to move said air therethrough in a continuous stream, said air being progressively heated as it is moved, and means in the passages located toward the discharge point therefrom for moistening said moving stream of air after it has been substantially heated.

28. In a heating plant, a casing forming a heat chamber and passages for conducting air about said heat chamber, including a multiplicity of pipes extending across a part of the heat chamber, and a moistening device located in said first-named passages beyond the point where the air is discharged from said pipes, in the path of movement of all air moving through said passages.

29. A hot air heating plant comprising a casing forming a heat chamber and passages for conducting air around said heat chamber to a point of discharge from the casing, a fan for moving the air, a fluid fuel burner, means including electric circuits and switch controls for operating the fan and the burner, and thermostat-controlled means for operating the respective switch controls at predeterminedly separated times.

30. A hot air heating plant comprising a casing forming a heat chamber and passages for conducting air around said heat chamber to a point of discharge from the casing, a fan for moving the air, a fluid fuel burner, means including electric circuits and switch controls for operating the fan and the burner, thermostat-controlled means for operating the burner switch control first and thereafter operating the fan switch control at a predetermined later interval of time.

31. A hot-air heating plant comprising a casing forming an interior heat chamber and air-conducting passages surrounding the same, the heat chamber having a multiplicity of end, top and bottom walls angularly disposed to form a chamber of irregular longitudinal-vertical cross-section, a fluid fuel burner positioned to direct the flame and combustion gases therefrom into said chamber, and means for discharging the gases of combustion from the chamber at two separated points above and laterally spaced from said burner.

32. A hot-air heating plant comprising a casing forming an interior heat chamber and air-conducting passages at the ends thereof, a multiplicity of pipes extending across said heat chamber to form a connection between said passages, a fluid fuel burner positioned to direct the flame and combustion gases therefrom across and over said pipes and into the top of the chamber, and means for discharging the gases of combustion from the chamber positioned so as to cause said gases of combustion to move back across and over said pipes.

33. A hot-air heating plant comprising a casing forming an interior heat chamber and air-conducting passages surrounding the same, the heat chamber having parallel side walls and a multiplicity of end, top and bottom walls angularly disposed so as to form a heat chamber of irregular longitudinal-vertical cross-section, a battery of pipes extending across said heat chamber to form a connection between two of said passages, a fluid fuel burner positioned to direct the flame and combustion gases therefrom into said chamber and across and over said pipes, and means for discharging the gases of combustion from the chamber positioned so as to cause said gases of combustion to move back across and over said pipes and along said parallel side walls.

34. A hot-air heating plant comprising a casing forming an interior heat chamber and air-conducting passages surrounding the same, said heat chamber being of extensive longitudinal-vertical cross-section, a fluid fuel burner positioned to direct the flame and combustion gases therefrom in one direction within the chamber, and means for discharging the gases of combustion positioned to cause said gases to move in another direction, said directing and discharging means being positioned relatively to each other and to the casing so as to cause said gases of combustion to reverberate and form a whirl in the heat chamber and wipe the heat-chamber walls of said surrounding passages.

35. A hot-air heating plant comprising a casing forming an interior heat chamber and air-conducting passages at the ends thereof, a battery of pipes extending across said heat chamber to form a connection between said passage leaving substantial portions of said heat chamber on each side of the pipes, a fluid fuel burner positioned to direct flame and gases of combustion against the undersides of said pipes and to cause it to pass across and over the battery and into the space at the other sides of the pipes, and means for discharging the gases of combustion positioned to cause the same to move from said space back across and over the pipes.

36. A hot-air heating plant comprising a casing forming a heat chamber and air passageways including an air intake passageway, a fluid fuel burner for directing a flame into said heat chamber, and means including a plurality of horizontal pipes and connections between the same in said air intake chamber for conducting away the gases of combustion.

37. A hot-air heating plant comprising a casing forming a heat chamber and air passageways including an air intake passageway, a fluid fuel burner for directing a flame into said heat chamber, means including a pipe in said air intake chamber for conducting away the gases of combustion, and a fan in said air intake chamber for drawing intake air over said pipe and forcing it through the other air passageways.

38. In a heating plant a casing forming a heat chamber and passages for conducting the air around said heat chamber, means for forcing the air through said passageways, an air cleaning chamber forming a part of said passageways, means for maintaining a water surface at a fixed level to form the bottom of said air cleaning chamber, and means in the air cleaning chamber for causing the air to whirl therein and to impinge while whirling upon said water surface.

In testimony whereof I hereunto affix my signature.

FRANK A. WHITELEY.